United States Patent Office 3,574,168
Patented Apr. 6, 1971

3,574,168
PROCESS FOR REDUCING OXIDATION OF
POLYCARBONAMIDE PELLETS
Wayne H. Martin, Vienna, W. Va., assignor to E. I. du
Pont de Nemours and Company, Wilmington, Del.
No Drawing. Filed Dec. 29, 1967, Ser. No. 694,409
Int. Cl. C08g 20/38
U.S. Cl. 260—78
5 Claims

ABSTRACT OF THE DISCLOSURE

Packaging of polyamide molding pellets wherein the polyamide is blanketed with an inert gas preferably from the time of extrusion and particularly during drying until packaging and wherein the voids surrounding the pellets in the packaged polyamide are filled with an inert gas rather than an air atmosphere to avoid loss of color stability.

BACKGROUND OF THE INVENTION

It is well known that polyamide pellets discolor when exposed to air at elevated temperatures, e.g., during drying prior to processing, and during processing (injection molding, extrusion, etc.) of the melted pellets. This discoloration or yellowing makes it difficult to obtain good color matches in pigmented resins and is aesthetically ojectionable in natural or unpigmented resins. Numerous patents have been issued which cover the addition of color stabilizers to polyamide resins in order to obtain color stability during subsequent processing and end use. Many of these color stabilizers are toxic and therefore cannot be used for applications in which the formed objects are in contact with food.

In the past, polyamide molding pellets have been packaged in various containers such as paper cartons, metal cans, etc., surrounded by air for storage and shipment. While yellowness of articles molded from polyamide molding pellets has been a problem in the past, the cause thereof has not been known.

SUMMARY OF THE INVENTION

It has now been found that yellowness in molded polyamide articles can be materially reduced without addition of color stabilizers and the complications attendant their use by storing the polyamide molding pellets from which they are made in an inert gas. The surprising feature of this discovery is the fact that the relatively small amount of oxygen present in the void space between the polyamide pellets in the usual sealed cans used for storage and shipment, during storage at room temperature is sufficient to cause poor color during the subsequent molding or extrusion process in which the polyamide pellets may be heated in an ample supply of air to dry them and then melted in air in an extruder or molding machine. Normally, a polyamide is made in an autoclave or a continuous reactor in the form of a molten ribbon which is passed into a quenching bath to solidify said ribbon after which the ribbon is diced into pellets dried by heating and packaged in a sealed container such as a can. In the present invention the polyamide is preferably blanketed in inert gas as soon as possible after extrusion and especially when it is being dried and when it is packaged, the package being filled with an inert gas and sealed ot prevent oxygen from entering the package. While the use of the inert gas blanket around the molten ribbon prior to quenching and dicing is not essential, any extended exposure of the polyamide to oxygen is detrimental.

The inert gas should contain less than 5 precent oxygen by volume and preferably less than 1 percent oxygen by volume.

A wide variety of inert gases can be used in the present invention. For economic reasons nitrogen gas or an inert gas mixture formed by burning natural gas is preferred. The latter may be produced in a Kemp generator to give an inert gas mixture. However, gases such as helium, neon, argon, krypton, xenon, radon, and carbon dioxide can readily be used in the present invention. For purposes of the present invention a gas is considered as an inert gas if it contains less than 5 percent oxygen by volume and does not react with the polyamide.

As used herein, polyamide molding pellets is intended to include pellets, powders, cubes, flakes, etc., or any other forms of solid polyamide intended for use as a molding or extrusion material. The present invention is useful with any of the common polyamides such as polyhexamethylene adipamide, polyhexamethylene sebacamide, polyhexamethylene dodecamide, and polycaprolactam.

DESCRIPTION OF THE PREFERRED EMBODIMENT

Throughout the following examples, the color of injection molded plaques is indicated by the yellowness index (YI-GERS) measured on a General Electric Recording Spectrophotometer by ASTM Method D 1925. The color of polymer flake (molding powder) is indicated by the Yellowness index (YIC) measured on a Model IV Colormaster Differential Colorimeter, manufactured by the Manufacturer's Engineering and Equipment Corporation, Hatboro, Pennsylvania. Details of the latter measurement may be found in the instruction manual supplied with the instrument. There is no known correlation between YIC measured on polymer flake and YI-GERS measured on injection molded plaques. However, an increase in yellowness index (either YIC or YI-GERS) indicates an increase in the visual yellowness of a sample. A difference of 2 YIC or 2 YI-GERS units can be detected by the naked eye.

Examples 1 to 4

In Examples 1–4 as reported in Table I, samples of approximately 5 lbs. of polyhexamethylene adipamide are taken from the commercial production lines as soon as practical after the molten ribbon has exited the autoclave, been quenched with water to solidify the melt, and cut by a dicer Immediately upon collecting the sample it is blanketed either with air or nitrogen, as shown in the table, and stored under this blanket until subsequent drying experiments can be run. The apparatus for the drying experiments is essentially a modified vacuum trap, the outer tube being approximately 45 mm. outside diameter and 11" long, the innertube 10 mm. outside diameter with ¾″ long cylindrical glass diffuser tip on the end so that the end of the diffuser is about ⅜″ from the bottom of the trap. With apparatus of these dimensions, the sample of approximately 60 g. of polymer for drying reaches a height of about 3¼″ from the bottom of the vessel. The vacuum trap is continuously purged with the gas indicated in Table I while said vacuum trap is immersed in an oil bath maintained at the indicated temperature for the indicated time.

To determine the effect of oxygen absorption on color development during subsequent drying, a sample of about 60 g. of polymer is rapidly transferred from the storage vessel to the drying tube which has been continually purged with preheated drying gas at a rate of about 30 ml. per minute. The filled tube is then immersed in an oil bath at the temperature indicated for a 2 hour drying period, during which time the sample is continually purged with the drying gas. The data in Table I show the drying temperature, drying gas, initial color and final color of the polymer after drying, as well as the color development during drying. The variation in initial color is due to normal batch-to-batch variation in the commercial product. The nitrogen used for drying in Examples 2 and 4 has a certified analysis of 19 parts per million oxygen.

while the other is purged with air and sealed in air. After storage for the period of time reported in Table II, the cans are punctured in such a way as to permit the measurement of oxygen concentration inside the can. Immediately after measuring the oxygen concentration, polymer cubes are measured prior to molding on the Colormaster, the cubes are then injection molded into color chips and the yellowness index of the molded chips measured on the General Electric Recording Spectrophotometer. The oxygen content of the gas drawn from the cans after storage is measured by means of a Beckmann D-2 oxygen analyzer. These results illustrate the advantage of storage in an inert gas atmosphere.

TABLE II

| Example | Inert gas or air | Storage time, weeks | Percent $O_2$, in can | Flake YIC | Molded YI-GERS | ΔYIC, Air-Inert | ΔYI-GERS Air-Inert |
|---|---|---|---|---|---|---|---|
| 5 | Inert | 2 | 4 | +2.5 | −16.8 | 0.2 | 3.2 |
|   | Air   | 2 | 21 | +2.7 | −13.6 |     |     |
| 6 | Inert | 2 | 2 | +1.9 | −14.7 | 1.4 | 3.1 |
|   | Air   | 2 | 21 | +3.3 | −11.6 |     |     |
| 7 | Inert | 2 | 4 | −0.6 | −19.7 | 1.2 | 4.2 |
|   | Air   | 2 | 21 | +0.6 | −15.5 |     |     |
| Average for 2 weeks storage | | | | | | 0.9 | 3.5 |
| 8 | Inert | 8 | 5 | +5.0 | −16.3 | 1.7 | 6.2 |
|   | Air   | 8 | 21 | +6.7 | −10.1 |     |     |
| 9 | Inert | 8 | 3 | +2.6 | −15.7 | 2.0 | 5.7 |
|   | Air   | 8 | 21 | +4.6 | −10.0 |     |     |
| Average for 8 weeks storage | | | | | | 1.9 | 6.0 |
| 10 | Inert | 56 | 3 | +2.6 | −19.2 | 5.2 | 9.9 |
|    | Air   | 56 | 16 | +7.8 | −9.3 |     |     |
| 11 | Inert | 56 | 2 | +5.3 | −12.3 | 3.8 | 9.7 |
|    | Air   | 56 | 16 | +9.1 | −2.6 |     |     |
| Average for 56 weeks storage | | | | | | 4.5 | 9.8 |

TABLE I

| | Storage prior to drying | | | | | | | |
|---|---|---|---|---|---|---|---|---|
| Example | Atmosphere | Time, days | Drying gas | Drying, temp. °C. | Drying, time, hr. | Initial YIC[1] | Final YIC | ΔYIC |
| 1 | Air      | 6  | Air          | 100 | 2 | +1.2 | +12.2 | 11.0 |
| 2 | Nitrogen | 21 | do           | 100 | 2 | −3.2 | +3.7  | 6.9  |
| 3 | Air      | 16 | Nitrogen[2]  | 120 | 2 | +1.2 | +10.9 | 9.7  |
| 4 | Nitrogen | 5  | do[2]        | 120 | 2 | −1.6 | +1.5  | 3.1  |

[1] Differences in intial YIC are due to different lots of polymer used.
[2] Contained 19 p.p.m. oxygen.

Examples 5 to 11

In Examples 5 to 11, polyhexamethylene adipamide molding powder is conveyed immediately from an autoclave dicer into a blender where it is dried for 2 hours at about 90° C. and purged with the gas from a Kemp generator having the composition by volume: 88 percent nitrogen, 11.6 percent carbon dioxide, 0.35 percent carbon monoxide, 0.03 percent oxygen and 0.01 percent water vapor. This is the gas referred to in Table II as "Inert gas." Following the 2 hour drying period, two 25 lb. samples are taken from the blender and each fed into suitable containers which can be sealed. One can is then purged with the inert gas from the Kemp generator, and canned and sealed under the same inert gas atmosphere

I claim:
1. Process for reducing oxidation of molding pellets of a polycarbonamide containing repeating units selected from the group consisting of hexamethylene adipamide, hexamethylene sebacamide, hexamethylene dodecanamide during storage at room temperature for a period of at least five (5) days comprising blanketing the polyamide during said storage with an inert gas which contains less than 5% oxygen by volume.

2. The process of claim 1 wherein the gas contains less than 1% oxygen by volume.

3. The process of claim 1 wherein the gas consists essentially of at least 1 member of the class consisting of nitrogen, helium, neon, argon, krypton, xenon, radon and carbon dioxide.

4. The process of claim 1 wherein the polycarbonamide is blanketed with the gas containing less than 5% oxygen by volume at the time of extrusion of polyamide in the process for forming said molding pellets and said blanket of gas is maintained over said polyamide through storage of the polyamide molding pellet.

5. The process of claim 1 wherein the polycarbonamide is blanketed with the gas containing less than 5% oxygen by volume at the time of drying an extruded polycarbonamide ribbon to be formed into polyamide molding pellets and said blanket is maintained through storage of the polycarbonamide molding pellet.

References Cited

UNITED STATES PATENTS

| | | | |
|---|---|---|---|
| 2,309,729 | 2/1943 | Gordon | 260—78 |
| 2,615,002 | 10/1952 | Hurwitz | 260—78 |
| 3,130,181 | 4/1964 | Sievenpiper | 260—78 |
| 3,031,433 | 4/1962 | Monroe | 260—78 |
| 3,232,909 | 2/1966 | Werner | 260—78 |
| 3,325,455 | 6/1967 | Warner | 260—78 |
| 3,379,696 | 4/1968 | Wiloth | 260—78 |

FOREIGN PATENTS

| | | | |
|---|---|---|---|
| 916,537 | 1/1963 | Great Britain | 260—78 |

HAROLD D. ANDERSON, Primary Examiner

U.S. Cl. X.R.

206—84; 260—45.7, 96; 264—176